United States Patent Office 2,703,738
Patented Mar. 8, 1955

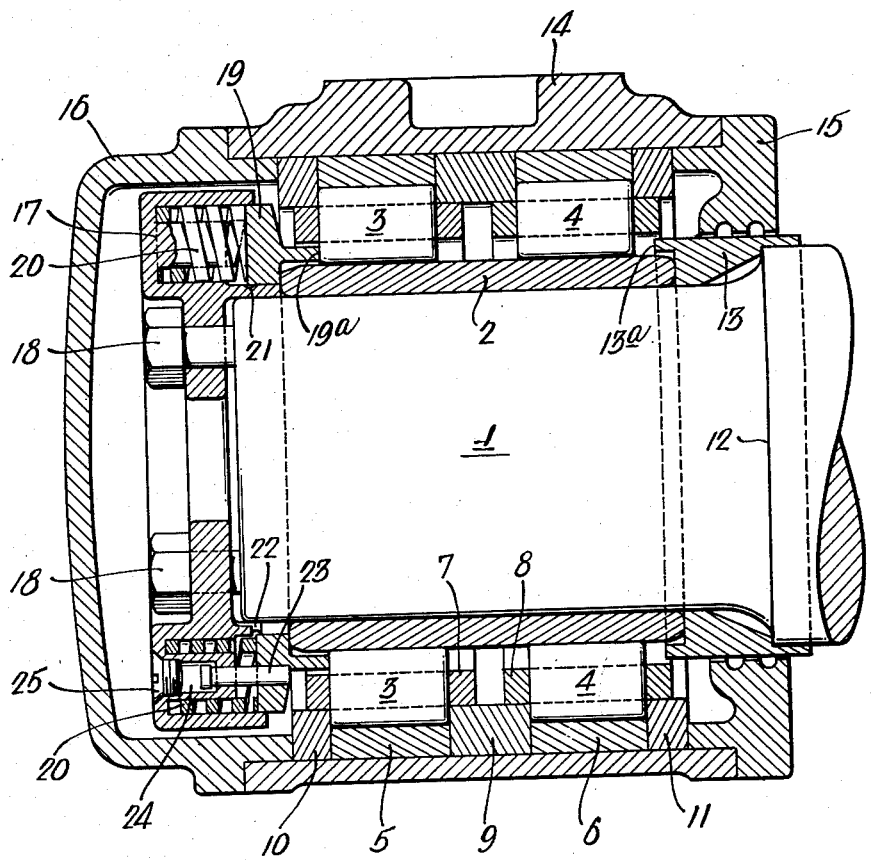

2,703,738

CYLINDRICAL ROLLER BEARINGS

Nils Arvid Palmgren and Viktor Synek, Goteborg, Sweden, assignors, by mesne assignments, to SKF Industries, Inc., Philadelphia, Pa., a corporation of Delaware Application January 5, 1953, Serial No. 329,576

Claims priority, application Sweden January 5, 1952

5 Claims. (Cl. 308—180)

The use of cylindrical roller bearings for mounting certain shafts, in which it is required to make possible a relative displacement between the shaft and the housing has certain advantages. An example is the axles of fast railway vehicles, in which an axial displacement within a cylindrical roller bearing itself can result in smoother running of the vehicle and less wear on the rails and wheels. At the same time, it is however, necessary for the bearings to be capable of taking up all thrust loads which may arise, for which purpose cylindrical roller bearings are not in themselves suitable. The present invention has for its purpose to provide a cylindrical roller bearing which in itself permits of an axial relative displacement between the inner and outer bearing members, but in which the thrust forces are taken up and absorbed without the use of separate thrust bearings of any kind. The invention is characterized mainly by a flange axially displaceable relative to one of the bearing members and engaging the ends of the rollers of one of the said rows, a resilient member operative between the said flange and an abutment member fixed relative to the last mentioned bearing member for taking up thrust forces between the flange and the rollers.

The invention is illustrated in the accompanying drawing which shows an axial section through an axle box according to one form of the invention.

In the figure, the numeral 1 designates the journal on which is mounted an inner bearing ring 2 common to two rows of cylindrical rollers 3 and 4. Each row of rollers is provided with an outer bearing ring 5 and 6 respectively. The rollers are separated and guided by cages 7 and 8. Between the two outer rings and the rows of rollers a guide ring is provided, which together with other guide rings 10 and 11 disposed outside of the rows of rollers fix and guide the latter. The guide rings 9, 10 and 11 thus serve as fixed flanges for the outer race rings.

Between the inner ring 2 and a shoulder 12 on the shaft is provided a distance sleeve 13 having a flange 13a at a suitable distance from the row 4 of rollers. The bearings are mounted in an axle box 14 which is closed on the inner side by a cover 15 and on the outer side by a cover 16. At the outer end of the shaft is a disc which serves as an abutment member 17 for taking up thrust forces directed toward the end of the axle and which is attached to the journal by means of bolts 18. The side of the abutment member 17 turned toward the bearings has the shape of an annular cylinder in which a flange member 19 is axially displaceable to a limited extent in the manner of an annular piston. The flange member 19 is provided with a flange 19a, having a guide surface for engaging the row 3 of rollers, when the bearing box is in its central position, as shown in the figure. A number of helical springs 20 are disposed in annular pockets in the abutment member 17. The springs are compressed if the flange 19a is subjected to thrust loads from the row 3 of rollers, in other words, if the bearing box is displaced toward the end of the shaft by outer forces. The springs 20 are prestressed so that only those forces acting on the flange member 19, which exceed a certain value are capable of displacing the flange member.

The springs 20 are entirely enclosed in the compression chamber formed by the abutment member 17 and the flange member 19. The volume of this chamber decreases upon relative movement between the members 17 and 19, in the direction which compresses the springs 20. The compression chamber has a very small clearance space and thus the increase in compressive pressure added to the forces of the springs will be considerable. The more quickly the axial displacement of the bearing box in the direction toward the end of the shaft takes place the greater will be the resistance from the flange member 19, since a certain length of time is required for the enclosed compressed air to leak out between the surfaces formed by the members 17 and 19. At the same time an energy absorbing effect on the movement is caused by this leakage.

In order to prevent the formation of a vacuum in the compression chamber, when the springs 20 return the flange member 19 to the original position after compression, a groove 21 and a channel 22 are provided in the abutment member. Thus, atmospheric pressure is restored in the chamber between the flange member 19 and the abutment member 17, when the flange resumes its original position.

In order to unite the abutment member 17, the flange member 19 and the springs 20 into a single unit for mounting, guide pins 23 are pressed into the flange 19 at a few locations around its periphery. These pins engage holes 24 in the abutment member 17, so that members 17 and 19 and the springs 20 will be held together and so that members 17 and 19 will be prevented from rotating relative each other. The openings 24 are closed by screws 25.

The invention is not limited to the form described and shown but may be applied in many different ways. Thus, elastic flanges may be provided for governing and suppressing the thrust movement in both directions. The elastic members may be of various designs and materials, for instance rubber. The number of rows of rollers in the bearing can vary and the bearing can be mounted on a through shaft. The device can also be used for other purposes than for railway axle boxes, if running conditions require similar qualities. The displaceable flange can be arranged at the outer bearing member instead of at the inner bearing member in which case the rollers are guided at the latter member. The expression "bearing member" is intended to cover not only the separate bearing rings shown in the drawing, but also for example the axle itself and the bearing housing when the rollers roll direct on these members.

We claim:

1. A cylindrical roller bearing having relatively axially displaceable outer and inner bearing members and at least one row of cylindrical rollers disposed therebetween, characterized by a flange axially displaceable relative to one of the bearing members and engaging the ends of the rollers of one of the said rows, a second flange fixed with reference to the other bearing member and engaging the opposite ends of the rollers of said row, and a resilient member operative between the said first named flange and an abutment member fixed relative to the bearing member relative to which the said flange is axially displaceable for taking up thrust forces between the flange and the rollers.

2. A roller bearing according to claim 1, characterized thereby that the resilient member is prestressed.

3. A roller bearing according to claim 1 characterized thereby that the axially displaceable flange and the abutment member together form a compression chamber enclosing the resilient member and arranged as that the volume of the compression chamber is decreased upon relative movement of the flange and the abutment member in a direction to compress the resilient member.

4. A roller bearing according to claim 1, characterized by means for uniting the axially displaceable flange, the abutment member and the resilient member to form a unit.

5. A roller bearing according to claim 3, characterized thereby, that the flange member is so dimensioned and disposed so as to uncover an opening between the flange member and another member for instance the abutment member upon movement towards its normal position, the said opening being in communication with the atmosphere in the bearing housing.

References Cited in the file of this patent

UNITED STATES PATENTS

| | | |
|---|---|---|
| 2,094,968 | Searles | Oct. 5, 1937 |
| 2,195,795 | Baker | Apr. 2, 1940 |